United States Patent [19]

Tomantschger et al.

[11] Patent Number: 5,162,169
[45] Date of Patent: * Nov. 10, 1992

[54] CATALYTIC RECOMBINATION OF HYDROGEN IN ALKALINE CELLS

[75] Inventors: Klaus Tomantschger, Mississauga; Erkut Oran, Willowdale, both of Canada; Kordesch, Karl, Lakewood, Ohio

[73] Assignee: Battery Technologies Inc., Mississauga, Canada

[*] Notice: The portion of the term of this patent subsequent to May 15, 2007 has been disclaimed.

[21] Appl. No.: 520,820

[22] Filed: May 9, 1990

Related U.S. Application Data

[63] Continuation-in-part of Ser. No. 375,888, Jul. 6, 1989, Pat. No. 4,925,747, which is a continuation of Ser. No. 234,749, Aug. 22, 1988, abandoned.

[30] Foreign Application Priority Data

Oct. 27, 1987 [CA] Canada ................................ 550336

[51] Int. Cl.⁵ .................................................. H01M 10/34
[52] U.S. Cl. ......................................... 429/59; 429/206
[58] Field of Search .................. 429/57, 59, 206, 94

[56] References Cited

U.S. PATENT DOCUMENTS

| | | | |
|---|---|---|---|
| 4,650,680 | 3/1987 | Brenner et al. | 429/94 X |
| 4,900,642 | 2/1990 | Tomantschger et al. | 429/59 |
| 4,925,747 | 5/1990 | Kordesch et al. | 429/59 |
| 4,929,520 | 5/1990 | Kordesch et al. | 429/94 |

Primary Examiner—Stephen Kalafut
Attorney, Agent, or Firm—Donald E. Hewson

[57] ABSTRACT

In rechargeable or primary electrochemical cells, hydrogen may evolve. The invention concerns the use of an auxiliary electrode material comprising manganese dioxide and a catalyst as the oxidant providing for the recombination of pressurized hydrogen, for example, the hydrogen being at pressures ranging from from substantially zero gauge pressure up to the relief pressure of the cell. The cell is a sealed cell having a manganese dioxide cathode, a zinc anode and aqueous electrolyte contacting both anode and cathode. The aqueous electrolyte may be alkaline or it may be ammonium chloride or zinc chloride, or mixtures thereof. The auxiliary electrode material, which may be mixed with the cathode material or be formed into a discrete auxiliary electrode, may optionally comprise a porous substrate, and in any event comprises $MnO_2$ and a catalyst for the recombination of pressurized hydrogen with the $MnO_2$. The substrate may be carbon black or graphite; the catalyst may be a metal, metal salt or metal oxide of elements such as lead, nickel, titanium, lanthanum, chromium, vanadium, tantalum and catalytically active alloys thereof. Most particularly, the catalyst may be silver, platinum, silver oxide, or silver dioxide.

15 Claims, 3 Drawing Sheets

CATALYTIC RECOMBINATION OF HYDROGEN IN ALKALINE CELLS

This application is a Continuation In Part of application Ser. No. 07/375,888 filed Jul. 6, 1989, now U.S. Pat. No. 4,925,747 issued May 15, 1990; which is a continuing application from application Ser. No. 07/234,749 filed Aug. 22, 1988, now abandoned.

FIELD OF THE INVENTION

This invention relates to primary or rechargeable, alkaline, sealed cells such as alkaline zinc/manganese dioxide cells. In particular, the invention relates to the use of a catalyst for the recombination of hydrogen in the cell. The invention aims to provide means of recombining hydrogen, which may be evolved during storage, recharging, use or even in abuse. Thus, loss of water may be avoided and the risk of pressure build up within the cell and cell leakage may be reduced.

BACKGROUND OF THE INVENTION

The prior art has concerned itself, for many years, with the problem of reducing or eliminating the loss of water in galvanic cells using aqueous electrolyte, and also with avoiding build up of excessive gas pressure in sealed cells. Hydrogen gas is evolved during charge or standby by several electrode materials such as aluminum, magnesium, zinc, iron, lead, etc. The electrodes in general do not have the capability of recombining the hydrogen and the evolved gas is usually vented, causing water loss, or pressure build up in hermetically sealed cells. In sealed cells, depending on the amount of hydrogen present and the rate of generation, excessive gas pressure can build up causing rupture of the safety vent and loss of electrolyte—resulting in cell failure and electrolyte leakage. It has previously been found that cells having a porous manganese dioxide cathode have the capability of recombining the hydrogen, provided catalytically active materials are applied to the cathode.

Two approaches are often used in efforts to solve the problems. These are:
1. Catalytic recombination of hydrogen and oxygen inside or outside the battery; in the latter case, provisions are made for the return of the product water to the electrolyte chamber [U.S. Pat. No. 3,630,778 (1971), U.S. Pat. No. 3,598,653 (1971), U.S. Pat. No. 3,622,398 (1971), U.S. Pat. No. 3,701,691 (1972)].
2. Use of an auxiliary (third) electrode as an overcharge recombination reactor as described in "Electrochem. Technol., 4, 383 (1966) by P. Ruetschi and J. B. Ockerman.

Kozawa et al in *Electrochemica Acta* Volume 26, No. 10 at pages 1489 to 1493, published in 1981, discussed the use of silver-catalyzed manganese dioxide as a hydrogen absorber. There, considerable studies were made by mixing various ranges of AgO or $Ag_2O$ with electrolytic manganese dioxide (EMD), and in some instances by mixing EMD with $AgNO_3$ solution. It was found, however, that at silver concentrations below about 0.3% of the EMD content, the recombination rate of the silver-catalyzed $MnO_2$ was essentially no different than that of uncatalyzed EMD.

Indeed, those same two authors in KORDESCH et al U.S. Pat. No. 4,224,384 report excellent hydrogen gas recombination capability of dry $MnO_2$ powder catalyzed with salts or oxides of platinum, palladium, ruthenium, rhodium, arsenic and lead. These materials, however, when employed in a wetted $MnO_2$ matrix, did not show significant hydrogen recombination rates at near atmospheric pressures. It has now surprisingly been found that these materials do exhibit hydrogen recombination properties when at least partially wetted by electrolyte, and in the pressure range of from substantially zero gauge pressure up to the relief pressure of the cell.

According to the invention there is provided a primary or rechargeable electrochemical sealed cell in which hydrogen may evolve, having a manganese dioxide cathode, a zinc anode, and an aqueous electrolyte (which may be alkaline, or ammonium chloride or zinc chloride, or mixtures thereof) contacting the anode and the cathode. There is a further auxiliary cathode material provided comprising a catalyst (which may be deposited on a porous substrate) for the recombination of pressurized hydrogen with the manganese dioxide, the auxiliary cathode material being located so as to be at least partially wetted by the electrolyte. The auxiliary cathode material may comprise a discrete element located in the cell, or it may be distributed throughout the cathode.

The substrate, when used, may be carbon or graphite, and the catalyst may be carbon, catalytically active noble or other metals, their salts and their oxides. The metals may be iron, zirconium, yttrium, calcium, magnesium, copper, lead, nickel, titanium, lanthanum, chromium, vanadium, tantalum, and catalytically active alloys thereof; as well as $AB_5$, "Mischmetal", or non-stoichiometric type alloys which can store hydrogen gas in their interior lattices. The noble metals, which may be mixed with carbon, may be, for example, platinum, palladium, ruthenium, rhodium or silver, or their salts or their oxides.

The auxiliary cathode material may be provided either in admixture with the manganese dioxide cathode, or as a discrete auxiliary electrode. In either event, it is in electronic contact with the cathode, and with no substantial electrical resistance between them. When a cathode comprises a plurality of pellets, the auxiliary cathode material may be in admixture with only one or all of the pellets; and if the cathode is extruded as a single sleeve, the auxiliary cathode material may be distributed throughout the cathode.

When the auxiliary cathode material is provided as an auxiliary discrete electrode, and the manganese dioxide cathode is cylindrically located about an anode core, then the auxiliary electrode may suitably be an annulus or ring of similar diameters to the cathode and located in electronic contact with it at one end of the cathode, or between pellets.

The present invention may provide economic and effective means of recombining hydrogen gas in galvanic cells. Noble metals such as platinum, palladium, rhodium, iridium, ruthenium, and osmium show high catalytic activity for hydrogen oxidation. In alkaline electrolytes, nickel and alloys of nickel with other metals (e.g. titanium and lanthanum) were found to be active catalysts.

If an annulus is used as an auxiliary catalysed electrode, then conveniently the auxiliary electrode may be a gas diffusion electrode. Gas diffusion electrodes that may be particularly applicable to the present invention are described in the co-pending United States Patent Disclosure "Metal and Metal Oxide Catalyzed Electrodes for Electrochemical Cells, and Method of Making Same" by K. Tomantschger and K. Kordesch, Ser.

No. 234,933, filed Aug. 22, 1988, and can be employed if higher recombination current densities are desired.

Embodiments of the invention will now be described by way of illustration with reference to the drawings in conjunction with the Examples, describing various electrodes of the invention and their operating characteristics.

DESCRIPTION OF PREFERRED EMBODIMENTS

Figure 1:
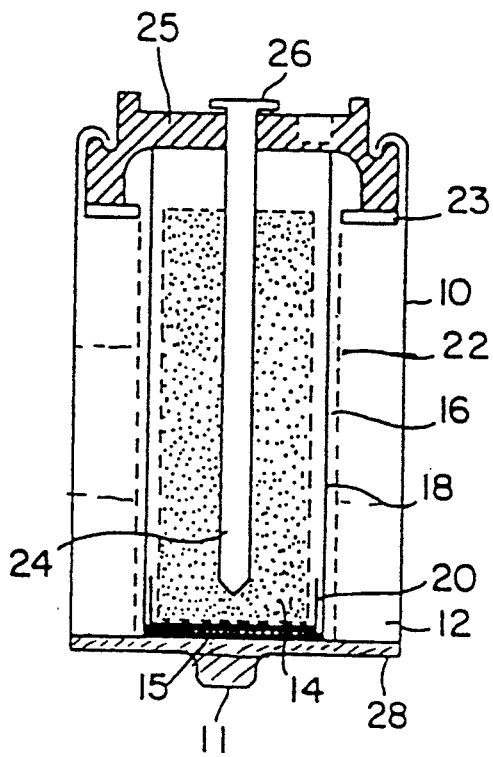
FIG. 1 is a vertical cross section of a typical embodiment of the invention.
Figure 2:
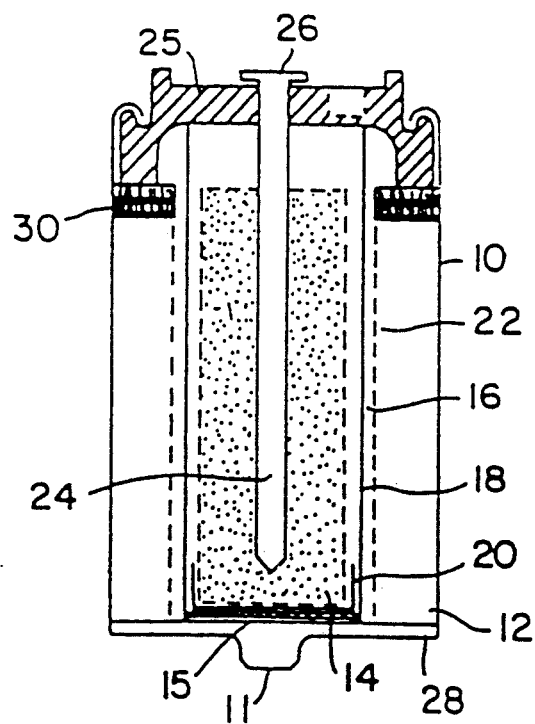
FIG. 2 is a vertical cross section of another typical embodiment of the invention.

FIGS. 1 and 2 of the drawings show two different embodiments of typical cells embodying the present invention. In both cases the cell comprises a steel can 10 housing a conventional manganese dioxide cathode 12 and zinc anode 14. The base of can 10 has boss 11 forming the cathode contact. The cathode 12 may comprise finely divided manganese dioxide and graphite, and is separated from anode 14 which may comprise zinc powder, by an electrolyte permeable separator 16. The electrolyte, which may be aqueous potassium hydroxide, permeates the zinc powder of anode 14 and cathode 12 through separator 16. The cells may be primary or secondary.

As shown, the anode may be confined by a basket 18, made for example, of Chicopee (Trade Mark) Rayon/polyvinyl alcohol. An oxygen recombination catalyst may also be used, for example, as described in TOMANTSCHGER and KORDESCH U.S. Pat. No. 4,900,642 issued Feb. 13, 1990. The basket 18 is provided with an end cap 20. Optionally, the cathode 12 is confined into cylindrical shape by a screen 22 and an annular plastic spacer 23 or a plastic closure 25. The plastic spacer 23 may be a perforated disc of a material such as polyethylene.

A current collector nail 24 projects into the anode 14 through the plastic closure 25, with its head 26 being outside of the cover 25 to form the anode contact. The cover 25 seals the can 12 by crimping formed around its edge.

FIG. 1 suggests the use of an auxiliary discrete cathode disk 28 formed of catalytically active carbon and located on the bottom of can 10 below insulating disk 15. The auxiliary cathode disk 28 is in physical and electronic contact with cathode 12, and is wetted by electrolyte dispersed in the can 10.

The embodiment of FIG. 2 differs from that of FIG. 1 in that, an auxiliary cathode annulus or washer 30 is placed beneath plastic closure 25, in physical and electronic contact with cathode 12. It, too, is wetted by the electrolyte dispersed in the can 10.

FIGS. 1 and 2 both show embodiments in which discrete auxiliary cathodes are used. However, where the auxiliary cathode material is mixed with the manganese dioxide cathode, then the inventive cell may be as described with reference to either FIGS. 1 or 2, but neither disk 28 nor washer 30 would be present, and the cathode 12 incorporates the auxiliary material. As well, the cathode may comprise a number of pellets (such as the three pellets shown in FIG. 1), or it may be extruded. Any or all of the pellets, or the extruded cathode, may have the auxiliary cathode material admixed with the manganese dioxide. Still further, if the cell has rectangular cathodes for flat plate or jelly roll cells, the auxiliary cathode material may be admixed throughout the cathode; or it may be placed in the cell in the form of an auxiliary electrode, or even in a catalytically active paste deposited as a strip on the cathode, or co-extruded therewith.

EXAMPLE I

A conventional rechargeable $MnO_2$—Zn cell as disclosed in U.S. Pat. No. 4,384,029 was prepared using a metal cage to confine the cathode active mass. The cathode mix was formed, pressed in rings, and thereafter three rings were placed in D-cell cans containing a metal cage, and separator baskets (Chicopee Rayon PVA) were inserted in the center.

| CATHODE COMPOSITION: | |
|---|---|
| 90.0 parts | 84.1% EMD TRONA"D" |
| 9.5 pts | 8.9% Lonza KS-44 Graphite |
| 7.0 pts | 6.5% 9 N KOH |
| 0.5 pts | 0.5% Acetylene Black |
| | Total weight: 87.5 g |

Catalytically active cathode blends were prepared substituting 3, 12, 20 and 30% of the EMD weight by $Ag_2O$ and D-size test cells were fabricated incorporating a 4 g $Ag_2O$ rich cathode material in the pip area of the cell, in the manner shown in FIG. 1.

| ANODE COMPOSITION: |
|---|
| 61.4% 3% Hg New Jersey 1205 Zn |
| 2.0% ZnO |
| 1.0% MgO |
| 0.8% 70/30 CMC/940 |
| 34.8% 9 N KOH 8% ZnO |
| Total Weight: 21 g |

A gelled zinc anode was extruded into the center of the cell, and thereafter a preassembled plastic closure with a brass nail current collector extending through it was placed in the cell. The cell was then sealed by impact crimping.

To demonstrate the capability of the present invention in terms of hydrogen recombination, the series of D cells containing the 3, 12, 20 and 30% substituted EMD discs was submitted to storage test at 65 C. The elevated temperature caused appreciable Zn gassing producing hydrogen overpressure in the cells. The test results are indicated in the following table:

| | 3% $Ag_2O$ | 12% $Ag_2O$ | 20% $Ag_2O$ | 30% $A_2O$ |
|---|---|---|---|---|
| 1 wk @ 65 C. | 6/6 OK | 6/6 OK | 6/6 OK | 6/6 OK |
| 2 wk @ 65 C. | 3/4 OK | 2/4 OK | 3/4 OK | 4/4 OK |
| 3 wk @ 65 C. | 1/1 OK | 0 | 1/1 OK | 2/2 OK |

Typical 0% $Ag_2O$ control cells exhibit a failure rate of 50% after 2 weeks at 65 C. (in this case failure means cell leakage), while all the substituted cells showed improvement and the 30% substituted cells showed no failures.

EXAMPLE II

A conventional porous $MnO_2$ cathode as used in primary alkaline or rechargeable alkaline $MnO_2$—Zn cells was formed, pressed in rings, and thereafter three rings were placed in C-cell cans containing a metal cage to confine the cathode mass, and separator baskets (Chicopee Rayon/PVA) placed in the center of a C-cell (FIG. 2).

| CATHODE COMPOSITION: |
| --- |
| 84.1% EMD TRONA"D" |
| 8.9% Lonza KS-44 Graphite |
| 6.5% 9 N KOH |
| 0.5% Acetylene Black |
| Total Weight: 37.5 g |

Catalytically active cathode blends were prepared substituting 0 and 30% of the EMD weight by $Ag_2O$ and C-size test cells were fabricated incorporating a 4 g $Ag_2O$ rich cathode ring at the open end of the cell, as shown in FIG. 2.

To demonstrate the capability of the present invention in terms of hydrogen recombination, two half cells of the C-cell size were fabricated, one with and one without the catalytically active cathode ring. Both open cells were placed vertically in a tube, the negative electrode void was filled with 9N KOH to the height of the polyethylene spacer, a spirally wound Ni wire was submersed into the electrolyte, and the cells were galvanostatically discharged at 50 mA for 20 hours removing 1 Ah stored energy from the positive electrodes (total capacity appr. 8 Ah). Cell tops were used to close the elements, and contained tube fittings attached to U tubes filled with water by means of flexible tubing. After crimping the cells were gas tight, and any pressure change was indicated by the manometers.

Both cells were galvanostatically charged with 10 and 25 mA to a pressure of 300 mm water. Neither cell showed significant hydrogen recombination at atmospheric pressure.

Thereafter, the U tube was replaced by precision manometers (total gas space 2.0 ml NTP), and both cells were galvanostatically charged with 50 mA at room temperature until the pressure inside the cell reached 30 psig. The positive electrode reaction involves conversion of MnOOH to $MnO_2$, and the counter reaction involves hydrogen generation on the surface of the Ni spiral wire inserted into the negative electrode cavity. Hydrogen gas was evolved at a rate of 2 ml per hour (at 50 mA). The results are summarized in FIG. 3.

Figure 3:
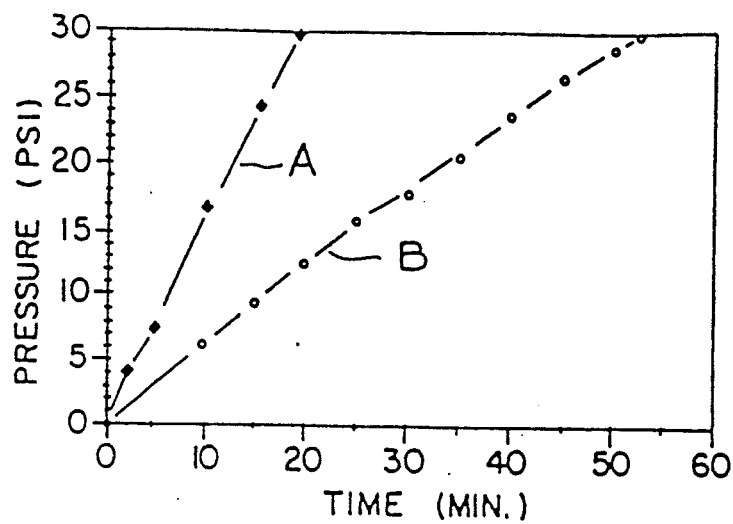
FIG. 3 is a graph comparing the operating characteristics of prior art and inventive cells as described in Example 2.

FIG. 3 shows the pressure build-up of hydrogen with time, and shows that pressure builds up faster in the conventional cell (curve A) than in the cell employing $Ag_2O$ material. Thus, it can be seen that the cell containing the catalytically active disk possessed a significant hydrogen recombination rate. Furthermore, after the power supply was disconnected, the pressure in the cell containing the active catalyst decreased significantly faster than the pressure in the control cell.

EXAMPLE III

A conventional porous $MnO_2$ cathode as used in primary alkaline or rechargeable alkaline $MnO_2$—Zn cells was formed, pressed in pellets, and thereafter three pellets were placed in C-cell cans containing a metal cage to confine the cathode mass, and separator baskets (Chicopee Rayon/PVA) were placed in the center of a C-cell (FIG. 2).

| CATHODE COMPOSITION: |
| --- |
| 84.1% EMD TRONA"D" |
| 8.9% Lonza KS-44 Graphite |
| 6.5% 9 N KOH |
| 0.5% Acetylene Black |
| Total Weight: 37.5 g |

A gas diffusion electrode, employing a mixture of Pd/Rh as hydrogen recombination catalyst, was prepared and incorporated into a 400 micron layer comprising a mixture of carbon available commercially as "Black Pearls (Trade Mark) 2000" and PTFE to form a foil. As additional option a separator sheet (Dexter (Trade Mark) C1235) can be pressed in one side and a Ni screen into the other side of the carbon/PTFE layer comprising 70% carbon and 30% PTFE. A ring with an outer diameter of 25 mm and an inner diameter of 14 mm was punched out of the foil and the carbon ring placed on the top of the cathode with the separator side facing the cathode. After the placement of a perforated polyethylene spacer, the assembly was pushed onto the cathode sleeve.

The function of the separator ring is to soak up electrolyte assisting in partial wetting of the carbon ring and providing ionic contact between hydrogen and the $MnO_2$ electrode. The carbon ring maintains electronic contact with the metal can and the metal cage, establishing a "hydrogen-$MnO_2$ short circuit element".

To demonstrate hydrogen recombination, two C-size cells were fabricated, one with and one without the catalyzed carbon ring. Both open cells were placed vertically in a tube, the cathode space was filled with 9N KOH to the height of the polyethylene spacer, a spirally wound Ni wire inserted as a counter electrode and the cells were galvanostatically discharged at 50 mA for 20 hours removing 1 Ah of the negative electrodes (total capacity approximately 8 Ah). The cell tops used to close the elements contained tube fittings attached to precision manometer (2 ml gas space).

Figure 4:
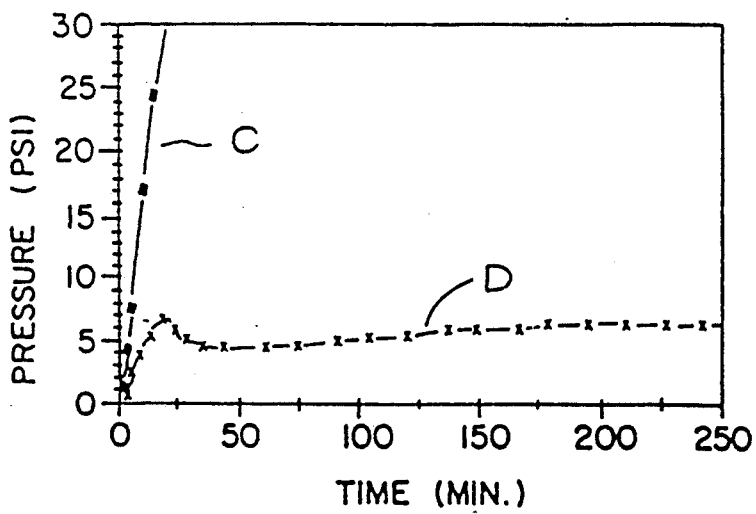
FIGS. 4 and 5 are graphs illustrating the operating characteristics of prior art and inventive cells as described in Example 3.

Both cells were galvanostatically charged with 50 mA at room temperature. The positive electrode reaction consisted of oxidation of MnOOH to $MnO_2$. The counter reaction involved generation of hydrogen on the surface of the Ni wire at a rate of 21 ml hydrogen per hour (at 50 mA). FIG. 4 shows the resulting pressure curves. Curve C represents use in pressure with time for the conventional electrode without the catalysed carbon ring.

The cell containing the catalytically active ring described herein invention recombined the hydrogen generated, maintaining a cell pressure of appr. 6 psig for over four hours (curve D). During the four hours of overcharge at 50 mA, the 3.5 cm2 ring recombined over 80 ml NPT of hydrogen gas by maintaining the pressure.

Figure 5:
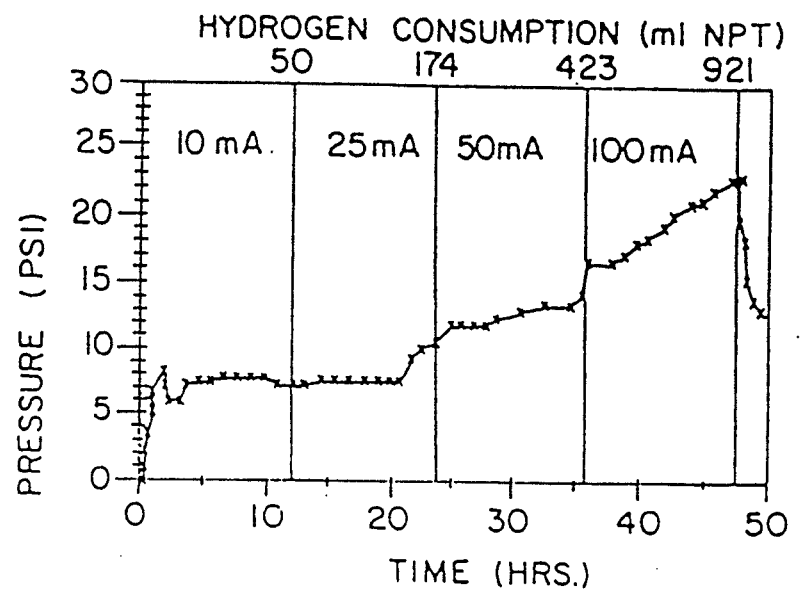

In a subsequent experiment, a 10 mA current was passed through a cell containing the gas diffusion electrode for 12 hours, then the current was increased to 25, 50 and 100 mA in 12 hour intervals. FIG. 5 shows that over a period of time of 48 hours, over 900 ml hydrogen were generated and the recombination rate maintained the internal cell pressure below 25 psig.

The maximum hydrogen gas recombination rate was determined to be in excess of 145 ml hydrogen per hour (3.5 cm2 electrode ring area)—which is equivalent to an hydrogen evolution current of 100 mA. For the C-size cell used, this is significantly more than required under "realistic user condition".

To determine the long term electrode performance, the electrode described herein was placed in a half cell and operated continuously at 50 mA/cm2 for over 1000 hours. The test was discontinued after consumption of in excess of 20 1 NTP hydrogen. The following table demonstrates the performance obtained in 6N KOH electrolyte at room temperature for hydrogen as reaction gas.

| Time [hrs.] | Hydrogen Consumption [l] | Current [mA/cm$^2$] | IR Free Potential [mV vs. Zn] |
| --- | --- | --- | --- |
| 0 | 0 | 50 | 22 |
| 163 | 3.4 | 50 | 10 |
| 307 | 6.4 | 50 | 25 |
| 475 | 9.9 | 50 | 30 |
| 691 | 14.3 | 50 | 46 |
| 859 | 17.8 | 50 | 47 |
| 1003 | 20.8 | 50 | 49 |

[The IR free potential is determined using laboratory procedures and standards, and is measured in millivolts as against the Reversible Hydrogen Electrode Reference].

EXAMPLE IV

Four groups of cells were prepared, where the cathodes of each of the groups of cells comprised three pellets. The specific cathode compositions are described below for each group;

| CATHODE FORMULATIONS | | | | |
| --- | --- | --- | --- | --- |
| | Control Group | Ag2O Group | Pt/C Group | Ag/C Group |
| MnO2 | 80 | 55 | 80 | 80 |
| Graphite | 10 | 10 | 10 | 10 |
| Carbon Black | 10 | 10 | 9 | 9 |
| Ag2O | — | 25 | — | — |
| 10% Pt/C | — | — | 1 | — |
| 10% Ag/C | — | — | — | 1 |
| 9N KOH | 7 | 7 | 7 | 7 |

In each of the cells in the Ag$_2$O Group, approximately one-third of the cathode EMD was replaced with Ag$_2$O in each of the three pellets of the cathode. In the Pt/C Group and Ag/C Group, the bottom and middle pellets had the same cathode formulation as the Control Group; but the top pellet contained either the 10% platinum on carbon black or 10% silver on carbon black, admixed with the cathode composition for each respective top pellet.

Figure 6:
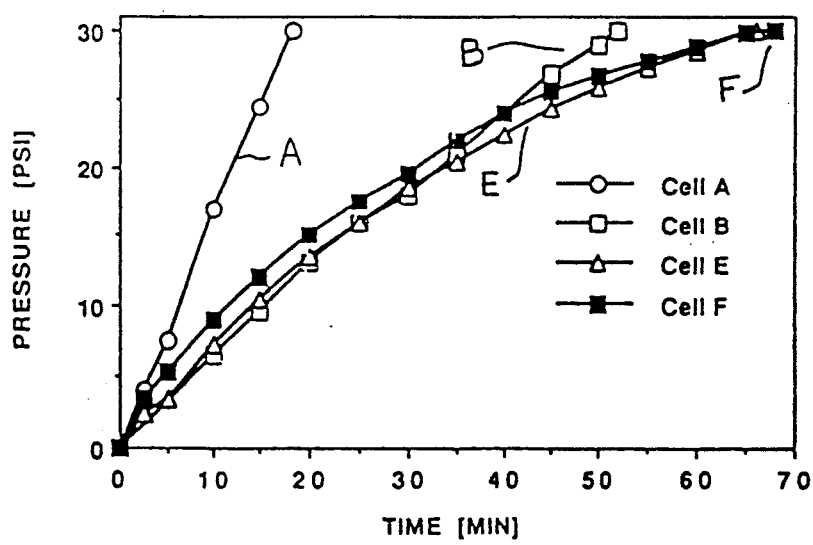
FIG. 6 is a graph similar to that of FIG. 3 comparing the operating characteristics of prior art and inventive cells as described in Example 4.

The cells were placed into a half cell arrangement such as that described with respect to Example II above. After each cathode was partially predischarged, the cells were sealed and hydrogen was generated at a rate of 21 ml hydrogen per hour. The increase of internal cell pressure with time was determined, and those results are shown in FIG. 6. The Control Group results are the same as shown in FIG. 3; as are the results shown for the Ag$_2$O cells. Curves E and F show the results for the Pt/C Group and the Ag/C Group, respectively.

An analysis of FIG. 6 shows that by the provision of 11 mg of silver or of platinum, consisting of 10% metal supported on a porous carbon carrier, the amount of catalytically active hydrogen recombination material is only 0.125% of the EMD of the top pellet, and yet superior results were achieved. As expected, based on Example II the Ag$_2$O Group of cells—where approximately 8.5 grams of silver was present per cell—showed a superior performance compared with the Control Group.

EXAMPLE V

Four groups of size "AA" cells were assembled. The first group was prepared with Ag$_2$O mixed to provide a silver loading of 10 mg. The second group also had a silver loading of 10 mg, and used graphite as a silver carrier. The third and fourth groups used carbon black as a silver carrier, giving silver loading of 5 mg and 1.9 mg, respectively.

The first and second groups were then assembled in two sub-groups each, where the first sub-group in each case had the hydrogen recombination catalyst only in the top pellet, and the second sub-group in each case had the hydrogen recombination catalyst throughout the entire cathode. The third group also was prepared in two sub-groups, where the first group had the hydrogen recombination catalyst placed in the cell as a discrete element in the form of a top washer above the upper pellet; and the second sub-group had the hydrogen recombination catalyst mixed throughout the entire cathode. The fourth group had a single sub-group, with the hydrogen recombination catalyst being found only in the top pellet of the cell.

In each case, the cells were assembled without their closures, and then they were placed in a test fixture which, itself, was filled with hydrogen gas to a pressure of 100 psi. The hydrogen recombination rate for all the various groups and sub-groups was determined over a period of 24 hours at room temperature. The results of those tests are shown in the following table:

| | HYDROGEN RECOMBINATION AT ROOM TEMPERATURE | | | |
| --- | --- | --- | --- | --- |
| Catalyst Location | Ag2O Group (10 mg Ag) | Ag/Graphite Group (10 mg Ag) | Ag/C Group (5 mg Ag) | Ag/C Group (1.9 mg Ag) |
| Top Washer | — | — | 5 ml | — |
| Top Pellet | 4 ml | 8 ml | — | 3 ml |
| Entire Cathode | 6 ml | 4 ml | 4.5 ml | — |

The use of commercially available metallic platinum and metallic silver, or their oxides, suitably supported on a carrier such as graphite or carbon black, as a hydrogen recombination catalyst, has been clearly demonstrated, as have other hydrogen recombination catalysts. The scope of the invention is defined by the appended claims.

We claim:

1. A primary or rechargeable electrochemical sealed cell in which hydrogen may evolve, said cell having a manganese dioxide cathode, a zinc anode, an aqueous electrolyte contacting the anode and the cathode, and a further auxiliary cathode material comprising manganese dioxide and a catalyst for the recombination of pressurized hydrogen within said cell;

wherein said pressurized hydrogen is recombined at least by the said auxiliary cathode material in the presence of said aqueous electrolyte;

wherein said auxiliary cathode material is at least partially wetted by said aqueous electrolyte;

wherein said auxiliary cathode material and said manganese dioxide cathode are in intimate physical contact one with the other, with no substantial electrical resistance therebetween;

said catalyst being chosen from the group consisting of silver, platinum, mono and divalent silver oxide;

wherein said silver, platinum, and divalent silver oxide are supported by a porous substrate, and said monovalent silver oxide may be supported by a porous substrate; and wherein said porous substrate is chosen from the group consisting of graphite and carbon black.

2. The primary or rechargeable cell of claim 1, wherein said aqueous electrolyte is chosen from the group consisting of alkaline electrolyte, ammonium chloride, zinc chloride, and mixtures of ammonium chloride and zinc chloride.

3. The primary or rechargeable cell of claim 2, wherein said catalyst catalyses the oxidation of hydrogen pressurized in the range of from substantially zero gauge pressure up to the relief pressure of the cell.

4. The primary or rechargeable cell of claim 3, in which the ratio of the hydrogen recombination catalyst to said manganese dioxide of said cathode is in the range of from 30:70 to 0.01:99.99.

5. The primary or rechargeable cell of claim 3, wherein said auxiliary cathode material is formed as a discrete electrode and is placed in electronic contact with said manganese dioxide cathode.

6. The primary or rechargeable cell of claim 1, wherein said manganese dioxide is mixed with 5 to 20% by weight of graphite.

7. The primary or rechargeable cell of claim 1, wherein said aqueous electrolyte is alkaline electrolyte.

8. The primary or rechargeable cell of claim 2, wherein said aqueous electrolyte is alkaline electrolyte.

9. The primary or rechargeable cell of claim 8, wherein the anode comprises zinc powder immobilized in a gel of the electrolyte.

10. The primary or rechargeable cell of claim 8, wherein the anode comprises a paste of zinc powder.

11. The primary or rechargeable cell of claim 8, wherein said cathode comprises a plurality of discrete pellets, and said auxiliary cathode material is mixed with the material of less than said plurality of pellets.

12. The primary or rechargeable cell of claim 8, wherein said cathode comprises a plurality of discrete pellets, and said auxiliary cathode material is mixed with the material of only one of said plurality of pellets.

13. The primary or rechargeable cell of claim 1, wherein said catalyst is present in the amount of from about 5% to 50% of the amount of said porous substrate; and wherein said further auxiliary cathode material is present in said cell in the amount of from about 1% to about 100% of the amount of said manganese dioxide present in said cell.

14. The primary or rechargeable cell of claim 8, wherein said catalyst is present in the amount of from about 5% to 50% of the amount of said porous substrate; and wherein said further auxiliary cathode material is present in said cell in the amount of from about 1% to about 100% of the amount of said manganese dioxide present in said cell.

15. The primary or rechargeable cell of claim 8, wherein said catalyst is monovalent silver oxide, and is present in the amount of from about 1% to 50% of the amount of said manganese dioxide present in said cell.

* * * * *